(12) United States Patent
Arden et al.

(10) Patent No.: US 8,047,919 B2
(45) Date of Patent: Nov. 1, 2011

(54) SIDESHAFT WITH INTERCONNECTING FUSE

(75) Inventors: Tony N Arden, Davisburg, MI (US); Samuel J Oram, Rochester Hills, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 486 days.

(21) Appl. No.: 12/098,346

(22) Filed: Apr. 4, 2008

(65) Prior Publication Data

US 2009/0253521 A1    Oct. 8, 2009

(51) Int. Cl.
*F16D 9/08* (2006.01)
(52) U.S. Cl. ............. 464/32; 72/713; 403/2; 403/359.1
(58) Field of Classification Search .................... 464/32, 464/170, 182; 403/2, 359.1; 72/370.25, 72/713; 29/888; 285/4
See application file for complete search history.

(56) References Cited

U.S. PATENT DOCUMENTS

| | | | | | |
|---|---|---|---|---|---|
| 1,783,605 | A | * | 12/1930 | Della | 285/4 |
| 3,982,408 | A | * | 9/1976 | Wright | 464/32 |
| 5,186,079 | A | * | 2/1993 | Gee | 403/2 X |
| 5,221,267 | A | * | 6/1993 | Folden | 285/4 X |
| 6,676,526 | B1 | * | 1/2004 | Poster | 464/170 X |

* cited by examiner

*Primary Examiner* — Gregory Binda
(74) *Attorney, Agent, or Firm* — Jennifer M. Brumbaugh; Mick A. Nylander; Rader, Fishman & Grauer PLLC

(57) ABSTRACT

An automotive shaft assembly is provided including a first barshaft having a first connection end and a second barshaft having a second connection end. A connection tube rotationally engages the first connection to the second connection end and includes a shear diameter configured to experience shear failure in the presence of an overload torque such that the first connection end is rotationally disengaged the said second connection end.

16 Claims, 2 Drawing Sheets

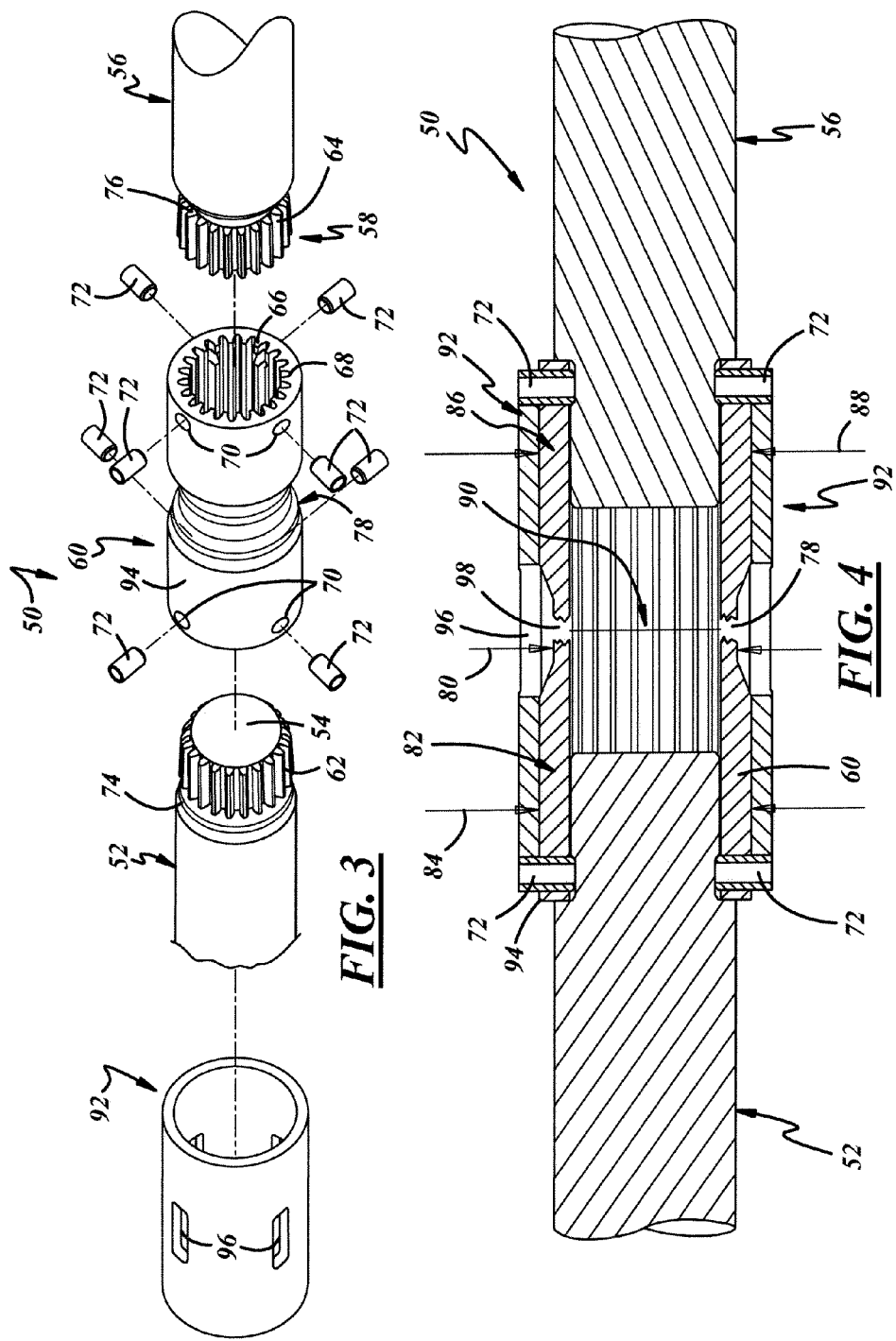

SIDESHAFT WITH INTERCONNECTING FUSE

TECHNICAL FIELD

The present invention relates generally to motor vehicle shafts, and more particularly concerns a interconnecting shaft with torque overload protection.

BACKGROUND

Connection shafts and drive units are common components in vehicles. The drive unit typically has an output shaft or an input shaft for receiving a joint. Typically, the drive unit is an axle, transfer case, transmission, power take-off unit or other torque device, all of which are common components in automotive vehicles. Typically, one or more joints are assembled to the shaft to form a propeller or drive shaft assembly. It is the propeller shaft assembly which is connected, for instance, at one end to the output shaft of a transmission and, at the other end, to the input shaft of a differential. The shaft is solid or tubular with ends adapted to attach the shaft to an inner race of the joint thereby allowing an outer race connection to a drive unit. The inner race of the joint is typically press-fit, splined, or pinned to the shaft making the outer race of the joint available to be bolted or press-fit to a hub connector, flange or stubshaft of the particular drive unit. At the other end of the propeller shaft, the same typical or traditional connection is made to a second drive unit when connecting the shaft between the two drive units. Optionally, the joint may be coupled to a shaft for torque transfer utilizing a direct torque flow connection.

In many off road vehicle environments considerable torque is applied through both the various shafts as well as their respective joints. All Terrain Vehicles and Utility Vehicles often have drivelines that are subject to unusually high torque values during unusual or extreme events. These events often arise when the vehicle lands after jumping off irregular terrain. The impact upon landing generates considerable torque in the drivelines. This torque is typically subsequently imparted into the individual components of the constant velocity joint. When the torque imparted into the CV joint components exceeds design considerations, the components can experience failure. A common design response to these extreme conditions has been to increase the size of the CV joint components in order to increase their maximum torque weathering capacity.

In addition to the extreme conditions, designers are utilizing higher capacity engines in vehicle designs. These higher capacity engines increase the power passed through the drivelines and therefore increase the overload torques experienced during extreme conditions. Existing methods of compensation require continued upsizing of the drivelines in order to accommodate the increased power and resulting increased overload torques. Continued upsizing, however, results in increases in mass of the driveline components with subsequent mass increases to the vehicle itself. Upsizing, therefore, poses undesirable restrictions on vehicle designers.

It would be advantageous to have a torque overload protection feature incorporated into the driveline such that component upsizing, and its negative consequences, could be avoided or minimized.

SUMMARY OF THE INVENTION

An automotive shaft assembly is provided including a first barshaft having a first connection end and a second barshaft having a second connection end. A connection tube rotationally engages the first connection to the second connection end and includes a shear diameter configured to experience shear failure in the presence of an overload torque such that the first connection end is rotationally disengaged from said second connection end.

The present invention has advantages by providing a torque overload protection without requiring an increase in component size. The present invention itself, together with further intended advantages, will be best understood by reference to the following detailed description and taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 3 is an exploded view illustration of the automotive shaft assembly illustrated in FIG. 2.

FIG. 4 is a cross-sectional illustration of the automotive shaft assembly illustrated in FIG. 2, the automotive shaft assembly illustrated in a rotationally disengaged fashion.

DETAILED DESCRIPTION

In the following description, various operating parameters and components are described for one or more constructed embodiments. These specific parameters and components are included as examples and are not meant to be limiting.

While the invention is described with respect to a automotive shaft assembly with overload torque protection for use in an all-terrain vehicle, the following apparatus is capable of being adapted for various purposes including automotive vehicles drive axles, motor systems that use a propeller shaft, or other vehicles and non-vehicle applications which require shaft assemblies for torque transmission.

Figure 1:
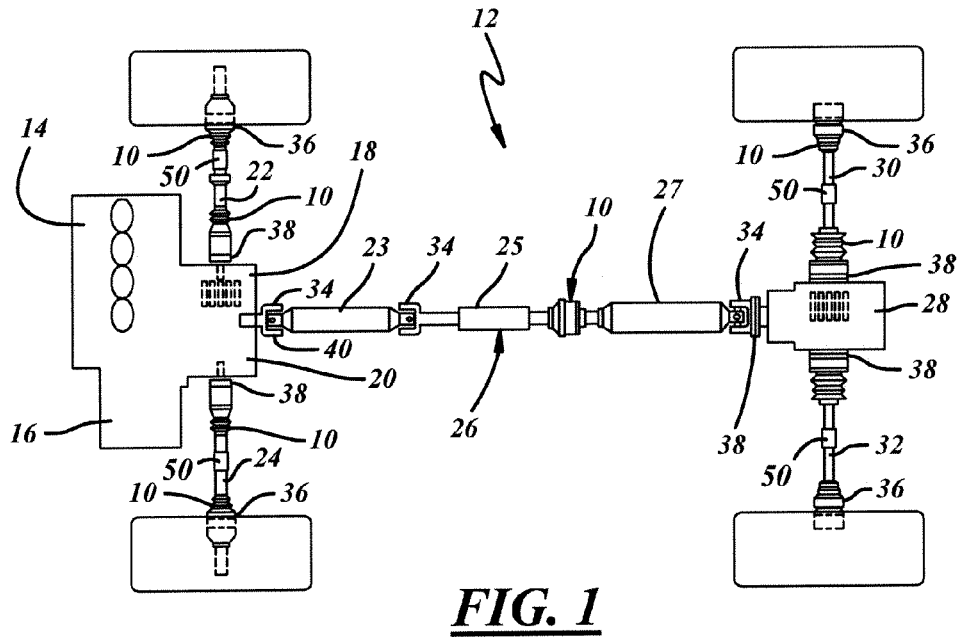
FIG. 1 shows a plan view of an exemplary drive system for a typical 4-wheel drive vehicle wherein the present invention may be used to advantage.

An exemplary drive system 12 for a typical 4-wheel drive vehicle is shown in FIG. 1. While a 4-wheel drive system is shown and described, the concepts herein presented could apply to a single drive unit system or multiple drive unit system, including rear wheel drive only vehicles, front wheel drive only vehicles, all wheel drive vehicles, and four wheel drive vehicles. In this example, the drive system 12 includes an engine 14 that is connected to a transmission 16 and a power take-off unit 18. A front differential 20 has a right hand side half shaft 22 and left hand side half shaft 24 each of which are connected to a wheel and deliver power to the wheels. On both ends of the right hand side half shaft 22 and left hand side half shaft 24 are constant velocity joints 10. A propeller shaft 26 connects the front differential 20 to a rear differential 28 wherein the rear differential 28 includes a rear right hand side shaft 30 and a rear left hand side shaft 32, each of which ends with a wheel on one end thereof. Constant velocity joints 10 are located on both ends of the half shafts 30, 32 that connect to the wheels and the rear differential 28. The propeller shaft 26, shown in FIG. 1, is a three-piece propeller shaft that includes a plurality of cardan joints 34 and one high-speed constant velocity joint 10. The propeller shaft 26 includes interconnecting shafts 23, 25, 27. The constant velocity joints 10 transmit power to the wheels through the propeller shaft 26 even if the wheels or the propeller shaft 26 have changed angles due to steering, raising or lowering of the suspension of the vehicle. The constant velocity joints 10 may be any of the standard types known, such as a plunging tripod, a cross groove joint, a fixed ball joint, a fixed tripod joint, or a double offset joint, all of which are commonly known terms in the art for different varieties of constant velocity joints 10. The constant velocity joints 10 allow for transmission of constant velocities at angles typically encountered in the off road travel of all-terrain vehicles in both the half shafts, interconnecting shafts and propeller shafts of these vehicles. Optionally, each cardan joint 34 may be replaced with any other suitable type of joint, including constant velocity joint types. The constant velocity universal joint with torque overload protection may be utilized to advantage for any of the above mentioned joint locations.

The shafts 22, 23, 24, 25, 27, 30, 32 may be solid or tubular with ends adapted to attach each shaft to an inner race or an outer race of a joint, thereby allowing the outer race or inner race to be connected to a hub connector 36, a flange 38 or stubshaft 40 of each drive unit, as appropriate, for the particular application. Thus, any of the traditional shafts identified in FIG. 1 may be automotive shaft assemblies with torque overload protection in accordance with the present invention (FIG. 2).

Figure 2:
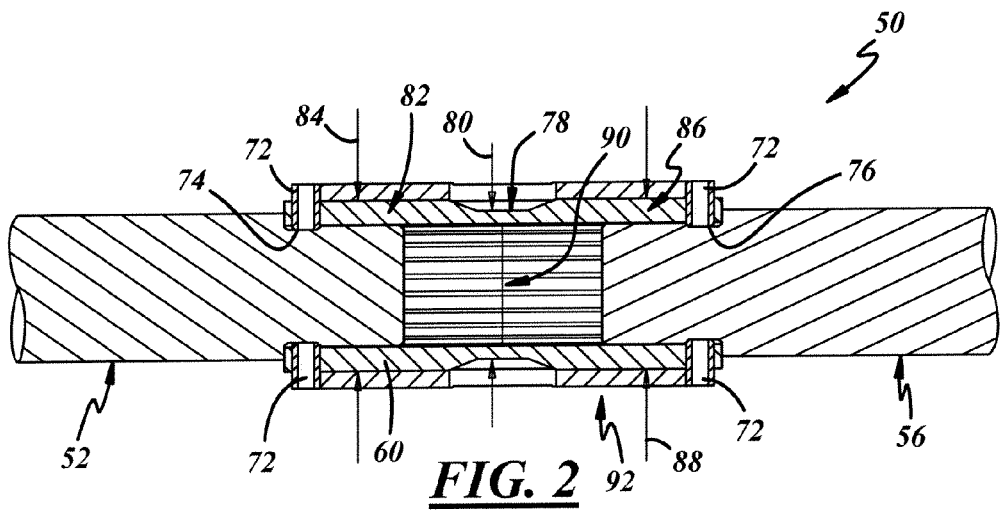
FIG. 2 shows a cross-sectional illustration of an automotive shaft assembly in accordance with the present invention, the automotive shaft assembly illustrated in a rotationally engaged fashion.

Referring now to FIGS. 2 and 3, which are illustrations of an automotive shaft assembly with torque overload protection 50 in accordance with the present invention. It is contemplated that the automotive shaft assembly 50 may comprise an automotive sideshaft, a driveshaft, or even an additional assembly tied in thereto. The automotive shaft assembly 50 is comprised of a first barshaft 52 having a first connection end 54 and a second barshaft 56 having a second connection end 58. It should be understood that the first and second barshafts 52,56 may comprise a two piece sideshaft 30,32 or other shaft assembly or may simply comprise a component to be mounted inline with these shafts. The two barshafts 52, 56 are placed in rotational engagement by way of a connection tube 60. This is preferably accomplished by the connection tube 60 rotationally engaging the first connection end 54 and the second connection end 58 such that the barshafts 52,56 rotate in unison.

Although a variety of configurations for such rotational engagement are contemplated, one embodiment contemplates the use of a first plurality of external splines 62 formed on the first connection end 54 and a second plurality of external splines 64 formed on the second connection end 58. A plurality of connection internal splines 66 formed on an inner surface 68 of the connection tube 60 are configured to engage the external splines 62,64 when inserted into the connection tube 60 such that the first barshaft 52 becomes in rotational unity with the second barshaft 56. The connection tube 60 may be further secured through the use of a plurality of circumferentially spaced engagement bores 70. A plurality of engagement screws 72 such as grub screws may be positioned within the engagement bores 70 and tightened down to further secure the connection tube 60 to the barshafts 52,56. As the splines 62,64,66 work to secure rotational engagement, the engagement screws 72 may in one embodiment be used to primarily secure axial engagement. In such an embodiment, the barshafts 52,56 may include a first channel 74 and a second channel 76 respectively to engage the screws 72 for axial fixation.

The present invention provides torque overload protection by way of a shear feature 78 formed into the connection tube 60. The shear feature 78 is configured to experience shear failure 98 during torque overload such that the first barshaft 52 becomes rotationally disengaged from the second barshaft 56 (see FIG. 4). In one embodiment, it is contemplated that the shear feature 78 is comprised of a shear diameter 80, namely a reduced diameter that when taken in combination with the material properties of the connection tube 60 will shear fracture at a given overload torque. In this embodiment, the connection tube 60 is preferably comprised of a first portion 82 having a first tube main diameter 84 and a second portion 86 having a second tube main diameter 88. The shear diameter 80 is preferably positioned between these portions 82,86 and is coincident with a mating region 90 of the first barshaft 52 and the second barshaft 56.

It is contemplated that when the shear feature 78 fails due to overload torque, the barshafts 52,56 will become rotationally independent. It may be desirable, however, to retain their general axially parallel orientation such that the maintain their general position and do not interfere with other automotive structures. As such the present invention contemplates the use of a protection sleeve 92 to maintain the axial orientation of the barshafts 52,56 during disengagement. In one embodiment, it is contemplated that the protection sleeve 92 surround the connection tube 60 without providing rotational engagement to the barshafts 52,56. In one embodiment, it is contemplated that the engagement screws 72 extend above the connection tube outer surface 94 after installation to secure the axial orientation of the protection sleeve 92. This insures the protection sleeve 92 remains properly orientated axially even after disengagement.

It is contemplated that the protection sleeve 92 may include a plurality of circumferentially distributed inspection ports 96 preferably positioned to coincide with the shear feature 78 after installation. In this way, the status of the connection tube 60 (engaged or sheared and disengaged) can be easily identified even after installation. This allows for simple identification of failure to facilitate maintenance. An advantage of the present invention is that when a vehicle experiences undesirable overload torque, only the connection tube 60 experiences failure and damage is not transferred to expensive driveline parts. The connection tube 60, and protection sleeve 92, may then be easily removed and replaced.

From the foregoing, it can be seen that there has been brought to the art a new and improved automotive shaft assembly with torque overload protection. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. An automotive shaft assembly comprising:
a first barshaft having a first connection end;
a second barshaft having a second connection end; and
a connection tube rotationally engaging said first connection to said second connection end, said connection tube including a shear diameter configured to experience shear failure in the presence of an overload torque such that said first connection end is rotationally disengaged from said second connection end, wherein said connection tube is secured longitudinally directly to an outer surface of said first and second barshafts;
wherein said first connection end comprises first external splines;
said second connection end comprises second external splines; and said connection tube comprises connection internal splines engaging said first external splines and said second external splines.

2. The automotive shaft assembly according to claim 1 wherein:
said connection tube comprises: a first portion comprising a first tube main diameter; and
a second portion comprising a second tube main diameter, wherein said shear diameter is positioned between said first portion and said second portion.

3. The automotive shaft assembly according to claim 1 wherein said connection tube comprises:
a plurality of circumferentially spaced engagement bores; and
a plurality of engagement members positioned in said engagement bores, said engagement members securing said connection tube to said first barshaft and said second barshaft.

4. The automotive shaft assembly according to claim 3, wherein:
said first barshaft includes a first channel; and
said second barshaft includes a second channel, said first and second channels configured to receive said engagement members.

5. The automotive shaft assembly according to claim 1, further comprising:
a protection sleeve surrounding said connection tube, said protection sleeve retaining said first barshaft and said second barshaft in approximate axially parallel orientation when said first barshaft and said second barshaft are rotationally disengaged.

6. The automotive shaft assembly according to claim 5, wherein said protection sleeve further comprises a plurality of circumferentially distributed inspection ports.

7. The automotive shaft assembly according to claim 5, wherein said connection tube comprises:
a plurality of circumferentially spaced engagement bores; and
a plurality of engagement screws positioned in said engagement bores, said engagement screws securing said connection tube to said first barshaft and said second barshaft;
wherein said plurality of engagement screws restrain axial movement of said protection sleeve, said plurality of engagement screws leaving said protection sleeve rotationally free.

8. An automotive driveline assembly comprising:
a differential assembly; and
at least one sideshaft assembly in communication with said differential assembly, said sideshaft assembly comprising:
a first barshaft having a first channel configured to receive at least one engagement screw and a first connection end;
a second barshaft having a second channel configured to receive at least one engagement screw and a second connection end; and
a connection tube rotationally engaging said first connection to said second connection end, said connection tube including a shear feature configured to experience shear failure in the presence of a design torque such that said first connection end is rotationally disengaged from said second connection end, wherein said connection tube includes at least one engagement bore spaced about the circumference of the connection tube, said engagement bore being configured to receive the at least one engagement screw and said engagement screw securing said connection tube to said first barshaft and said second barshaft.

9. An automotive driveline assembly as described in claim 8, wherein said shear feature comprises a shear diameter, said connection tube comprising:
a first portion comprising a first tube main diameter; and
a second portion comprising a second tube main diameter, wherein said shear diameter is positioned between said first portion and said second portion.

10. The automotive driveline assembly according to claim 8 wherein:
said first connection end comprises first external splines;
said second connection end comprises second external splines; and
said connection tube comprises connection internal splines engaging said first external splines and said second external splines.

11. The automotive driveline assembly according to claim 8, further comprising:
a protection sleeve retaining said first barshaft and said second barshaft in approximate axially parallel orientation when said first barshaft and said second barshaft are rotationally disengaged.

12. The automotive driveline assembly according to claim 11, wherein said protection sleeve further comprises a plurality of circumferentially distributed inspection ports.

13. The automotive driveline assembly according to claim 11, wherein:
said at least one engagement bore is a plurality of engagement bores spaced about the circumference of the connection tube;
said at least one engagement screw is a plurality of engagement screws positioned in said engagement bores, said engagement screws securing said connection tube to said first barshaft and said second barshaft; and
said plurality of engagement screws restrain axial movement of said protection sleeve.

14. A method of protecting an automotive shaft assembly from overload torque comprising:
utilizing a first barshaft having a first connection end and a second barshaft having a second connection end;
rotationally connecting said first connection end to said second connection end using a connection tube, said connection tube is directly secured longitudinally to an outer surface of the first barshaft and the second barshaft, said connection tube including a shear feature configured to experience shear failure in the presence of the overload torque such that said first connection end is rotationally disengaged from said second connection end; and
maintaining said first barshaft and said second barshaft in approximate axially parallel orientation when said first barshaft and said second barshaft are rotationally disengaged using a protection sleeve surrounding said connection tube.

15. A method according to claim 14, wherein said protection sleeve includes a plurality of circumferentially distributed inspection ports positioned such that said shear feature may be inspected after assembly.

16. A method according to claim 14, wherein said shear feature comprises a shear diameter.

* * * * *